June 21, 1938.    J. ZAGORSKI    2,121,464
ANNULAR VALVE SEAT
Original Filed July 31, 1933
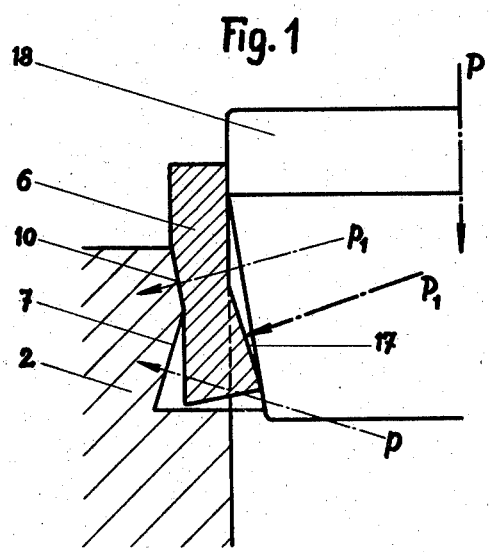
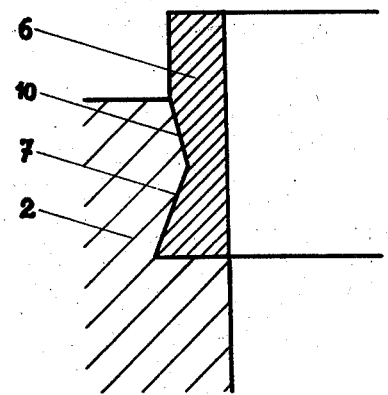
Johann Zagorski
INVENTOR
his ATTY Patented June 21, 1938

2,121,464

UNITED STATES PATENT OFFICE 2,121,464

ANNULAR VALVE SEAT

Johann Zagorski, Vienna, Austria

Original application July 31, 1933, Serial No. 682,995. Divided and this application March 16, 1934, Serial No. 715,833

1 Claim. (Cl. 251—167)

This application is a division of my copending application, Serial No. 682,995, filed July 31, 1933.

This invention relates to the fixing in position of and forming of a tight joint about a valve seat ring. It is already known that a hard seat having a collar or flange may be provided by pressing the seat into an undercut groove in the passage controlled by the valve. This seat forms a part of the lateral delimiting surface of the passage wall. In the hitherto known types of seat rings, however, a tight joint is obtained by the collar or flange, because by pressing the material of the seat ring into the undercut groove in the casing this collar or flange is pressed into close contact with the casing. It is extremely difficult to obtain an effectively tight joint in this manner, since the surfaces to be brought together must be absolutely smooth and true. Furthermore, high quality steels of which hard seatings of this nature are made have a higher coefficient of expansion than cast steel, cast iron, or wrought iron. Therefore heating of the parts loosens the seat and thus causes leaks.

The present invention provides a method of pressing hard seats of high quality steel having no collar or flange of any kind, into an undercut groove in the wall of the passage controlled by the valve. This is accomplished in such a manner that the annular seat is put into a state of high inherent tension which remains effective in pressing the ring with great force against the sides of the undercut groove in the casing.

Under the action of heat this lateral pressure is very considerably increased, the seating ring of high quality steel having a higher coefficient of expansion than the material of the casing which may be made, for example, of cast iron, cast steel, or wrought iron. Thus with highly superheated steam of temperatures up to 500° C. and at pressures as high as 100 atm. absolutely tight fitting of the valve seat is ensured.

The carrying out of the invention is illustrated, by way of example, in the accompanying drawing, in which:

Fig. 1 shows a sectional view of a seat ring according to the invention before the pressing of the same into position with a die.

Fig. 2 shows a sectional view of the ring of Figure 1 after it has been pressed into place.

In order that the seat ring 6 shall fit absolutely tightly in the casing this ring is pressed, as indicated in Fig. 2, into an undercut groove 7 the upper portion of which is slightly tapered as at 10. The outer surface of the ring 6 has a similarly tapered portion 10 turned thereon for the necessary fraction of its height, and is otherwise cylindrical, while the inside of the ring is first cylindrical and then tapered to form a conical surface 17 for a height corresponding to that of the undercut groove 7. If powerful pressure P be applied to the specially shaped die 18, this latter, in moving downwards, will act with the pressure $P_1$ upon the conical portion 17 of the inner surface of the seat ring, and will eventually cause this inside surface to become cylindrical from end to end, as shown in Fig. 2. The material displaced thereby is of slightly greater volume than that of the undercut groove 7, so that when the ring is pressed into position there is very considerable pressure $p$ and $p_1$ against the inner wall of the casing 2, which pressure ensures a tight joint in the manner indicated above.

What I claim is:

In a valve seat construction, a body having a bore, a counterbore at one end of the bore, the side wall of the counterbore having two portions disposed at an angle to each other, meeting at a line intermediate the lower wall and the upper edge of the counterbore and flaring in opposite directions from said line, and a seat ring mounted in said counterbore and having flared portions conforming to and tightly engaging the correspondingly flared portions of said side wall to form a seal and securing means between the body and the seat ring.

JOHANN ZAGORSKI.